US007963841B2

(12) United States Patent
Baerlocher et al.

(10) Patent No.: US 7,963,841 B2
(45) Date of Patent: Jun. 21, 2011

(54) GAMING DEVICE HAVING AN INDICATOR SELECTION WITH PROBABILITY-BASED OUTCOME

(75) Inventors: Anthony J. Baerlocher, Reno, NV (US); Cari L. Blomquist, Reno, NV (US); Lance R. Peterson, Reno, NV (US)

(73) Assignee: IGT, Reno, NV (US)

( * ) Notice: Subject to any disclaimer, the term of this patent is extended or adjusted under 35 U.S.C. 154(b) by 822 days.

(21) Appl. No.: 11/534,451

(22) Filed: Sep. 22, 2006

(65) Prior Publication Data

US 2007/0015566 A1 Jan. 18, 2007

Related U.S. Application Data

(63) Continuation of application No. 10/734,307, filed on Dec. 12, 2003, now Pat. No. 7,112,137, and a continuation of application No. 09/990,693, filed on Nov. 9, 2001, now Pat. No. 6,676,516, and a continuation-in-part of application No. 09/605,809, filed on Jun. 28, 2000, now Pat. No. 6,315,664.

(51) Int. Cl.
*A63F 13/00* (2006.01)

(52) U.S. Cl. ................. 463/20; 463/18; 463/40; 463/42

(58) Field of Classification Search .................... 463/20, 463/25, 16, 1, 18, 40, 42
See application file for complete search history.

(56) References Cited

U.S. PATENT DOCUMENTS

| | | | |
|---|---|---|---|
| 2,545,644 | A | 3/1951 | Benton et al. |
| 3,975,022 | A | 8/1976 | Figueroa |
| 4,051,939 | A | 10/1977 | Murphy et al. |
| 4,182,515 | A | 1/1980 | Nemeth |
| 4,410,178 | A | 10/1983 | Partridge |
| 4,624,459 | A | 11/1986 | Kaufman |
| 4,695,053 | A | 9/1987 | Vazquez, Jr. et al. |
| 4,732,386 | A | 3/1988 | Rayfiel |
| 4,991,848 | A | 2/1991 | Greenwood et al. |
| 5,058,893 | A | 10/1991 | Dickinson et al. |
| 5,116,055 | A | 5/1992 | Tracy |
| 5,152,529 | A | 10/1992 | Okada |

(Continued)

FOREIGN PATENT DOCUMENTS

DE 476586 5/1929

(Continued)

OTHER PUBLICATIONS

4DU Dice Unit Advertisement, [online] [retrieved on Sep. 3, 2002]. Retrieved from the Internet at <URL: http://www.starpoint.uk.com/4du/htm>.

(Continued)

*Primary Examiner* — Dmitry Suhol
*Assistant Examiner* — Brandon Gray
(74) *Attorney, Agent, or Firm* — K&L Gates LLP

(57) ABSTRACT

A gaming device operable having at least one input device. The processor, under control of a processor, is operable to enable a player to participate in a play of a game including a plurality of selectable indicators. Each selectable indicator is associated with an independent probability. The play of the game involves a pick of one of the selectable indicators and a determination of whether the picked selectable indicator is a success indicator or a failure indicator.

13 Claims, 5 Drawing Sheets

U.S. PATENT DOCUMENTS

| | | | | |
|---|---|---|---|---|
| 5,364,100 | A | 11/1994 | Ludlow et al. | |
| 5,395,111 | A | 3/1995 | Inoue | |
| 5,449,173 | A | 9/1995 | Thomas et al. | |
| 5,456,465 | A | 10/1995 | Durham | |
| 5,515,486 | A | 5/1996 | Amro et al. | |
| 5,542,669 | A | 8/1996 | Charron et al. | |
| 5,560,603 | A | 10/1996 | Seelig et al. | |
| 5,584,763 | A | 12/1996 | Kelly et al. | |
| 5,664,998 | A | 9/1997 | Seelig et al. | |
| 5,711,525 | A | 1/1998 | Breeding | |
| 5,823,872 | A | 10/1998 | Prather et al. | |
| 5,823,874 | A | 10/1998 | Adams et al. | |
| D400,597 | S | 11/1998 | Hedrick et al. | |
| 5,833,538 | A | 11/1998 | Weiss | |
| D402,702 | S | 12/1998 | Seelig et al. | |
| 5,848,932 | A | 12/1998 | Adams | |
| 5,851,147 | A | 12/1998 | Stupak et al. | |
| 5,873,781 | A | 2/1999 | Keane | |
| D406,865 | S | 3/1999 | Heidel | |
| 5,882,261 | A | 3/1999 | Adams | |
| 5,911,418 | A | 6/1999 | Adams et al. | |
| 5,927,714 | A | 7/1999 | Kaplan | |
| 5,976,015 | A | 11/1999 | Seelig et al. | |
| 6,004,207 | A | 12/1999 | Wilson, Jr. et al. | |
| 6,015,346 | A | 1/2000 | Bennett | |
| 6,059,658 | A | 5/2000 | Mangano et al. | |
| 6,086,066 | A | 7/2000 | Takeuchi et al. | |
| 6,089,976 | A | 7/2000 | Schneider et al. | |
| 6,089,977 | A | 7/2000 | Bennett | |
| 6,089,978 | A | 7/2000 | Adams et al. | |
| 6,102,798 | A | 8/2000 | Bennett | |
| 6,105,962 | A | 8/2000 | Malavazos et al. | |
| 6,113,098 | A | 9/2000 | Adams | |
| 6,142,873 | A | 11/2000 | Weiss et al. | |
| 6,142,874 | A | 11/2000 | Kodachi et al. | |
| 6,155,925 | A | 12/2000 | Giobbi et al. | |
| 6,159,097 | A * | 12/2000 | Gura | 463/20 |
| 6,159,098 | A * | 12/2000 | Slomiany et al. | 463/25 |
| 6,162,121 | A | 12/2000 | Morro et al. | |
| 6,173,955 | B1 | 1/2001 | Perrie et al. | |
| 6,190,255 | B1 | 2/2001 | Thomas et al. | |
| 6,203,429 | B1 | 3/2001 | Demar et al. | |
| D441,031 | S | 4/2001 | Seelig et al. | |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,970 | B1 | 5/2001 | Shimizu et al. | |
| D443,313 | S | 6/2001 | Brettschneider | |
| 6,251,013 | B1 | 6/2001 | Bennett | |
| 6,254,481 | B1 | 7/2001 | Jaffe | |
| 6,261,177 | B1 | 7/2001 | Bennett | |
| 6,267,669 | B1 | 7/2001 | Luciano, Jr. et al. | |
| 6,270,411 | B1 | 8/2001 | Gura et al. | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,315,663 | B1 | 11/2001 | Sakamoto | |
| 6,315,664 | B1 | 11/2001 | Baerlocher et al. | |
| 6,336,863 | B1 | 1/2002 | Baerlocher et al. | |
| 6,340,158 | B2 | 1/2002 | Pierce et al. | |
| 6,368,216 | B1 | 4/2002 | Hedrick et al. | |
| 6,386,974 | B1 | 5/2002 | Adams | |
| 6,398,220 | B1 | 6/2002 | Inoue | |
| 6,419,579 | B1 | 7/2002 | Bennett et al. | |
| 6,461,241 | B1 | 10/2002 | Webb et al. | |
| D465,531 | S | 11/2002 | Luciano, Jr. et al. | |
| 6,481,713 | B2 | 11/2002 | Perrie et al. | |
| 6,533,660 | B2 | 3/2003 | Seelig et al. | |
| 6,537,152 | B2 | 3/2003 | Seelig et al. | |
| 6,569,015 | B1 | 5/2003 | Baerlocher et al. | |
| 6,582,307 | B2 | 6/2003 | Webb | |
| 6,592,457 | B1 | 7/2003 | Frohm et al. | |
| 6,609,972 | B2 | 8/2003 | Seelig et al. | |
| 6,676,516 | B2 | 1/2004 | Baerlocher et al. | |
| 6,712,694 | B1 | 3/2004 | Nordman | |
| 6,783,457 | B2 | 8/2004 | Hughs-Baird et al. | |
| 6,863,606 | B1 | 3/2005 | Berg et al. | |
| 2001/0046891 | A1* | 11/2001 | Acres | 463/18 |
| 2002/0095836 | A1 | 7/2002 | Segan et al. | |
| 2004/0248647 | A1 | 12/2004 | Rothschild et al. | |
| 2004/0248648 | A1 | 12/2004 | Rothschild et al. | |

FOREIGN PATENT DOCUMENTS

| | | | |
|---|---|---|---|
| EP | 0 874 337 | A1 | 10/1998 |
| EP | 0 886 250 | | 12/1998 |
| EP | 0 921 503 | | 6/1999 |
| EP | 0 945 837 | A2 | 9/1999 |
| EP | 0 984 409 | A2 | 3/2000 |
| FR | 811.060 | | 4/1937 |
| GB | 912685 | | 12/1962 |
| GB | 2268415 | | 12/1994 |
| GB | 2295043 | | 5/1996 |
| WO | WO 93/03464 | | 2/1993 |
| WO | WO 97/27570 | | 7/1997 |

OTHER PUBLICATIONS

American Bandstand Brochure written by Anchor Games, published in 2001 in or before December thereof.

"Beer Game: High-Low," [online] [retrieved on May 3, 2001]. Retrieved from <URL: Real Beer Page: Beer Game: High-Low>.

Big Shot!™ Advertisement published by Aristocrat Technologies, Inc., published in 2002 in or before December thereof.

Big Top Keno Advertisement published by Aristocrat Technologies, Inc., published in 2000 in or before December thereof.

Bonus Roulette Brochure written by R. Franco, available prior to Sep. 22, 2006.

Buck's Roulette Brochure written by R. Franco, available prior to Sep. 22, 2006.

Chariot's of Fortune Brochure written by R. Franco, available prior to Sep. 22, 2006.

Classic Pot of Gold Brochure written by Ace Coin Equipment Ltd., available prior to Sep. 22, 2006.

Cyberdyne Gaming Brochure written by Cyberdyne Gaming, available prior to Sep. 22, 2006.

Double Up Poker Game Description written by IGT published prior to 2001 in or before December thereof.

Elvira® Mistress of the Dark™ Advertisement written by IGT, published in 2002 in or before December thereof.

Elvis Hits Advertisement written by IGT, published in 1999 in or before December thereoff.

"High Low Card Game," written by geocities.com [online] [retrieved on May 3, 2001]. Retrieved from the Internet at <URL: http://www.geocities.com/Athens/Styx/2440/card.html>.

"High-Low Card Game," [online] [retrieved on May 3, 2001]. Retrieved from <URL: http://math.hws.edu/eck/cs124/labs/lab7/cards.html>.

Holy Smoke! Brochure written by Impulse Gaming Ltd., available prior to Sep. 22, 2006.

In Between Game Description written by IGT published prior to 2001 in or before December thereof.

Jack and the Beanstalk™ Brochure written by AC Coin & Slot, available prior to Sep. 22, 2006.

"Jackpot Party," [online] [retrieved on Feb. 7, 2001]. Retrieved from the Internet at <URL: http:// www.wmsgaming.com/products/video/video/vjpp/howto.html>.

"The Jackpot Party Keeps Rolling," written by WMS Gaming [online] [retrieved on Feb. 7, 2001]. Retrieved from the Internet at <URL: www.wmsgaing.com/company/press-jackpot-party.html>.

King of the Grill™ Brochure written by AC Coin & Slot, available prior to Sep. 22, 2006.

Line-Up! Brochure written by AC Coin & Slot, available prior to Sep. 22, 2006.

Little Green Men Jr.™ Advertisement written by AC Coin & Slot, available prior to Sep. 22, 2006.

Little Green Men Jr.™ Article written by AC Coin & Slot, published in Strictly Slots Feb. 2003.

Miss America Brochure written by AC Coin & Slot, available prior to Sep. 22, 2006.

Mix and Match Advertisement written by AC Coin & Slot, available prior to Sep. 22, 2006.

"Mix and Match," written by Frank Legato, published in Strictly-Slots Apr. 2002.
"Money Grab," written by Frank Legato, published in Strictly Slots Apr. 2001.
"Money Grab™," written by WMS Gaming [online] [retrieved on Jan. 30, 2003]. Retrieved from <URL: http://www.wmsgaming.com/products/video/mg/index.html>.
Monster Match Article written by A.c. Coin & Slot Co., published in Strictly Slots Jan. 2002.
"On The Money!," published in Strictly Slots Dec. 2000.
Payout!™ Advertisement [online] [retrieved on Jan. 15, 2001]. Retrieved on the Internet at <URL: www.csds.com/Gaming/Products/g__Payout.htm>.
"Payout!," written by Casino Data Systems, available prior to Sep. 22, 2006.
Pick a Prize Brochure written by Acres Gaming Incorporated, published prior 2001 in or before December thereof.
Power Slotto™ Brochure published by AC Coin & Slot prior to 2002 in or before December thereof.
Press Your Luck Brochure published by AC Coin & Slot prior to 2002 in or before December thereof.
Quick Pick PayTime™ Brochure written by Acres Gaming Incorporated, published prior to 2001 in or before December thereof.
R&B™ Brochure published by AC Coin & Slot, available prior to Sep. 22, 2006.
Reel Dice Advertisement written by Gerber & Glass, published in 1936 in or before December thereof.
Royal Roulette Brochure written by Impulse Gaming Ltd., available prior to Sep. 22, 2006.
Silver City Roundup Brochure published by AC Coin & Slot, available prior to Sep. 22, 2006.
"Slot Machine Buyer's Handbook, A Consumer's Guide to Slot Machines" (in part), written by David L. Saul and Daniel R. Mead, published in 1998 in or before December thereof.
"Slot Machines a Pictorial History of the First 100 Years," $5^{th}$ edition (in part), written by Marshall Fey, published in 1983, 1989, 1991, 1994 and 1997 in or before December thereof.
"Slot Machines on Parade," $1^{st}$ edition written by Robert N. Geddes and illustrated by Daniel R. Mead, published in 1980 in or before December thereof.
Spin-A-Lot Brochure written by Acres Gaming Incorporated, published prior to 2001 in or before December thereof.
"Take Your Pick," written by Anchor Games, published in Strictly Slots Mar. 2001.
Welcome to Video Reality! Brochure, written by Atronic Casino Technology Ltd., published in 1995 in or before December thereof.
Yahtzee Bonus Advertisement written by Mikohn, published in 1999 in or before December thereof.
Copyright Atronic Casino Technology, 1995 "Volcano Island" and "Hot Cash".

* cited by examiner

GAMING DEVICE HAVING AN INDICATOR SELECTION WITH PROBABILITY-BASED OUTCOME

PRIORITY CLAIM

This application is a continuation application of, and claims the benefit of, U.S. patent application Ser. No. 10/734,307, now U.S. Pat. No. 7,112,137, filed on Dec. 12, 2003, which, in turn, is a continuation application of U.S. patent application Ser. No. 09/990,693, now U.S. Pat. No. 6,676,516 filed on Nov. 9, 2001, which, in turn, is a continuation-in-part application of U.S. patent application Ser. No. 09/605,809, now U.S. Pat. No. 6,315,664, filed on Jun. 28, 2000, and each of the foregoing applications is hereby incorporated by reference in its entirety.

CROSS-REFERENCE TO RELATED APPLICATIONS

This application is related to the following commonly-owned co-pending patent application: U.S. patent application Ser. No. 10/243,707 filed on Sep. 13, 2002.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a primary game wherein players may select indicators which are either success or failure indicators based on a mathematical calculation using an independent probability for each indicator.

BACKGROUND OF THE INVENTION

Gaming machines currently exist with bonus schemes in which the player has one or more opportunities to choose a particular selection or indicator from a group of indicators. An indicator may be any symbol or image such as a number, letter or graphical representation of a person, place or thing. When a player chooses an indicator, the game will either award the player with a bonus value or terminate the bonus round. The outcome depends upon the particular indicator selected by the player.

When the player selects an indicator which awards a bonus value, the player receives one or more bonus values, and the player has another chance to select another indicator. Each time the player selects such a success indicator, the game typically provides an award to the player and displays a message for the player such as "NEXT." This message means that the bonus round continues and the player may choose another indicator. The player then selects another indicator, and this process continues until the player selects an indicator which terminates the bonus round. When the player selects such a failure indicator, typically the game displays a message for the player such as "COLLECT." This message means that the bonus round has terminated, and the player collects any bonus values the player accumulated.

Gaming machines with this type of bonus scheme are programmed so that in each bonus round certain indicators or a certain number or percentage of indicators are success indicators and certain indicators or a certain number or percentage of indicators are failure indicators. Consequently, the percentage of success indicators is predetermined and fixed. Therefore, when playing a bonus round, it is impossible for the player to select success indicators beyond the fixed percentage. Chance is involved in the timing as to when the player chooses a failure indicator—before or after achieving the fixed percentage of success indicators. European Patent Application No. EP 0 945 837 A2 filed on Mar. 18, 1999 and assigned on its face to WMS Gaming, Inc. discloses a bonus scheme generally of this type.

SUMMARY OF THE INVENTION

The present invention provides a gaming device which has a primary game which includes a plurality of selectable indicators wherein each of the selectable indicators has a certain independent probability of being a success indicator or a failure indicator. Similar to flipping a coin where the predetermined independent probability of being heads or tails is fifty percent, in the present invention there is a predetermined probability of each indicator being a success indicator or a failure indicator. Upon or prior to the selection of the indicator, the processor in the gaming device determines, based on that probability, if the indicator is a success indicator or a failure indicator. In one embodiment, all of the selectable indicators have the same probability. Alternatively, the selectable indicators may have different probabilities. Game manufacturers, casinos and others who commercialize the gaming device of the present invention may program the primary game with desired probabilities for success indicators and failure indicators, depending on the payout desired and the level of excitement desired. Accordingly, in any play of the primary game, all of the indicators may be success indicators.

When a player makes a wager, the primary game begins. The primary game begins by providing the player with a plurality of selectable indicators. In one embodiment, the game determines, based on the predetermined independent probability for each indicator whether each indicator is a success or a failure indicator. The player chooses an indicator. The processor of the gaming device, displays a success indicator or a failure indicator. In one embodiment of the present invention, if the processor displays a failure indicator, the primary game terminates. If the processor displays a success indicator, the game awards the player with a displayed award or value corresponding to the success indicator. The value numerals may themselves be the success indicator. The amount of the value for each success indicator may vary. After the player achieves a success indicator, the player receives the appropriate value, and the game gives the player another chance to choose another indicator.

In this embodiment, this process continues until the gaming device displays a failure indicator or until the player has chosen all of the indicators in the primary game, in which case, the primary game terminates. If the player chooses all of the indicators and they are all success indicators, the game may award the player with an achievement value, the primary game may automatically repeat the game or may provide a bonus game. Upon termination of the primary game, the game accumulates all of the credits which the player has won and awards them to the player.

In one embodiment of the present invention, the primary game is placed in the context of a dodgeball game. The indicators are represented by a plurality of target characters.

A separate character throws balls at the target characters or indicators. The player decides which target character will try to catch the ball. Each target character can catch the ball or be hit by the ball. If the player chooses a target character who catches the ball (i.e., a failure indicator), the primary game ends. If the player chooses a target character who is hit by the ball (i.e., a success indicator), the game awards the player with a value. The primary game terminates when a target character catches a ball or after the ball hits all of the target characters in the primary game.

It is therefore an object of the present invention to provide a gaming device having a primary game with indicators having a predetermined probability-based outcome.

Another object of the present invention to provide a gaming device having a primary game wherein the percentage of success indicators is not predetermined or fixed.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from, the following Detailed Description and the figures.

DETAILED DESCRIPTION OF THE INVENTION

Gaming Device and Electronics

Figure 1:
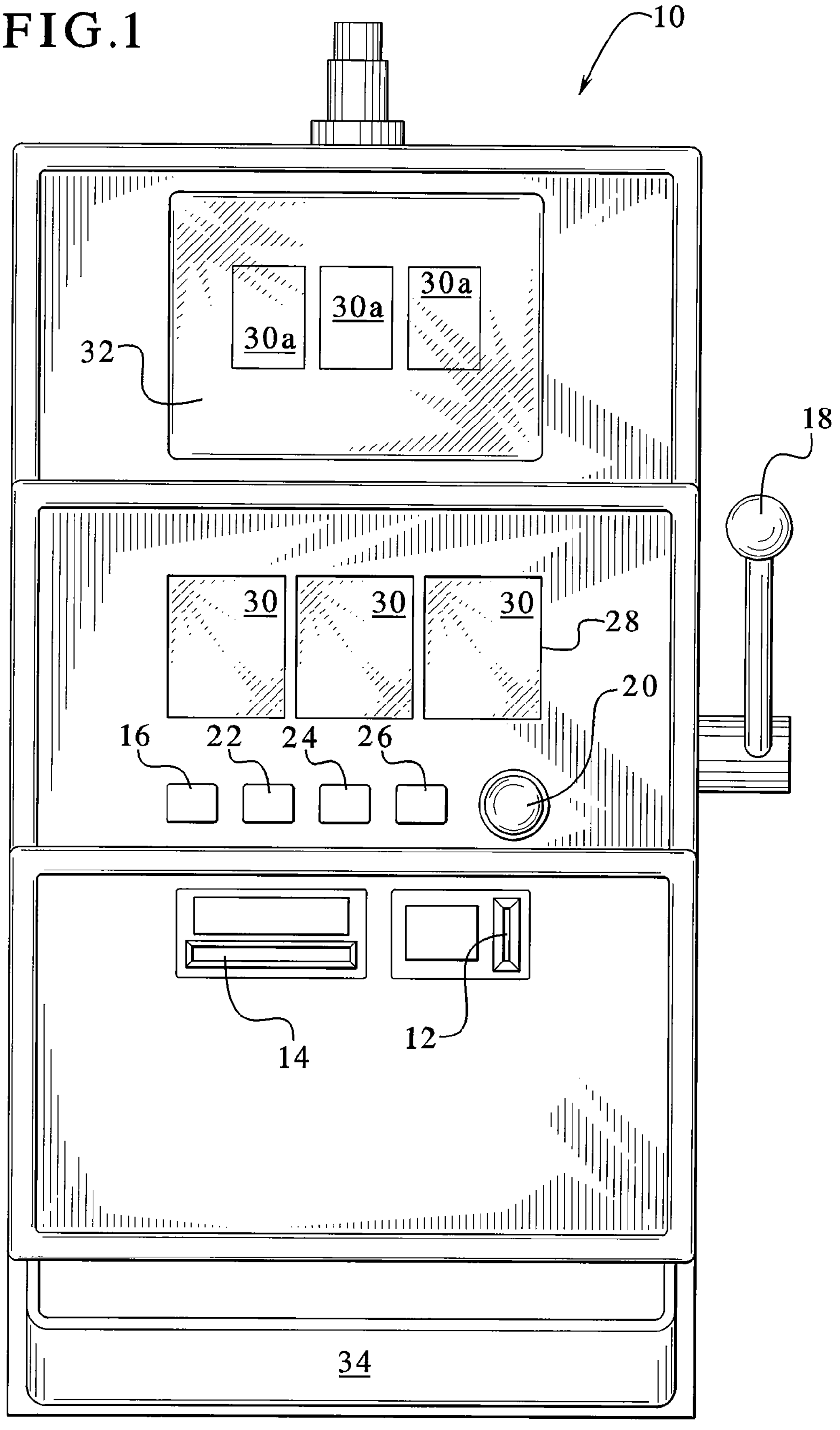
FIG. 1 is a front plan view of one embodiment of the gaming device present invention.

Referring now to the drawings, FIG. 1 generally illustrates a gaming device 10 of one embodiment of the present invention, having the controls, displays and features of a conventional gaming machine. Gaming device 10 is constructed so that a player can operate gaming device 10 while standing. However, it should be appreciated that gaming device 10 can be constructed as a pub-style table-top game (not shown) which a player can operate while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can also incorporate any bonus triggering events which trigger a bonus scheme. The symbols and indicia used on and in gaming device 10 may be in mechanical, electrical or video form.

As illustrated in FIG. 1, gaming device 10 includes a coin slot 12 and bill acceptor 14 where the player inserts money. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 34. The gaming device 10 may employ other payout mechanisms such as credit slips redeemable by a cashier or electronically recordable cards which keep track of the player's credits.

Figure 2:
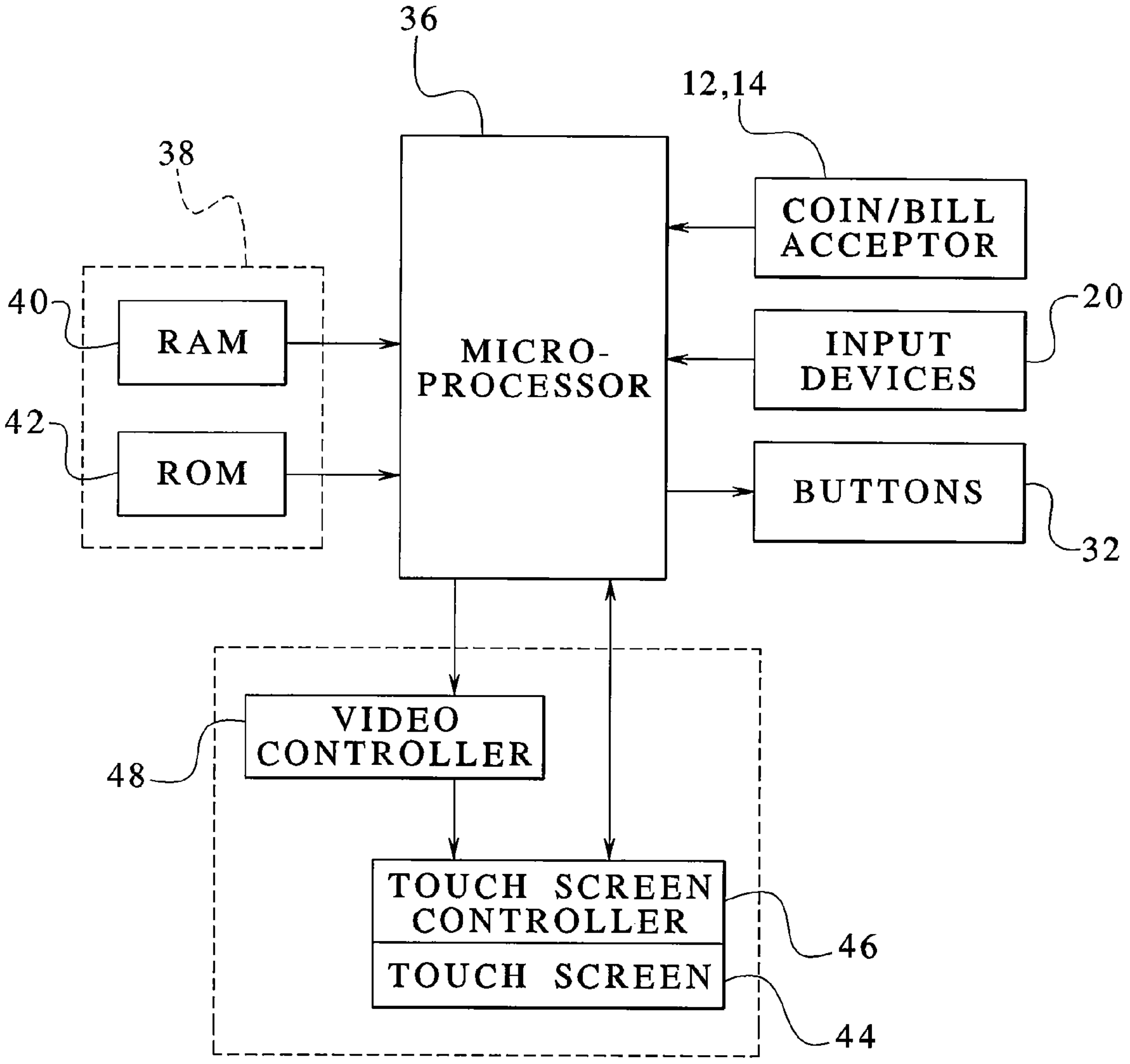
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device such as play buttons 20. The processor 36 is preferably a microprocessor or microcontroller-based platform which is capable of displaying images, symbols and other indicia such as images of people, characters, places, things and faces of cards. The memory device 38 can include random access memory (RAM) 40 for storing event data or other data generated or used during a particular game. The memory device 38 can also include read only memory (ROM) 42 for storing program code which controls the gaming device 10 so that it plays a particular game in accordance with applicable game rules and pay tables.

As illustrated in FIG. 2, in terms of input, the player uses play buttons 20 to input signals into gaming device 10, and preferably uses a touch screen 44 (and an associated touch screen controller 46). Touch screen 44 and touch screen controller 46 are connected to a video controller 48 and processor 36. A player can make decisions and input signals such as selecting indicators into the gaming device 10 by touching touch screen 44 at the appropriate places. As further illustrated in FIG. 2, the processor 36 can be connected to coin slot 12 or bill acceptor 14. The processor 36 can be programmed to require a player to deposit a certain amount of money in order to start the game.

It should be appreciated that although a processor 36 and memory device 38 are preferable implementations of the present invention, the present invention can also be implemented using one or more application-specific integrated circuits (ASIC's) or other hard-wired devices, or using mechanical devices. Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection, microwave link, and the like.

To operate the gaming device 10, the player must insert the appropriate amount of money at coin slot 12 or bill acceptor 14 and then pull the arm 18 or push the play button 20. As long as the player has credits remaining, the player can play again.

In addition to winning credits in the primary game, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device may also include a display device such as a video monitor 32 shown in FIG. 1 enabling the player to play a bonus round.

In one embodiment, the game of the present invention includes a primary game and if a player makes a wager, the gaming device 10 automatically begins the primary game. In another embodiment, the game includes a secondary or bonus game or round, which is triggered upon a qualifying condition in the primary game. In one example embodiment, as indicated by block 50 in FIG. 3, the game of the present invention, such as a primary game or bonus game, begins by providing a player with a plurality of indicators 30 separately or a plurality of indicator 30*a* on a display device 32 (FIG. 1). The indicators can display varying graphics and be of varying sizes, shapes and colors. The indicators are shown in FIG. 4 as squares in a grid, however, it should be appreciated that indicators can be separated and spread apart in an orderly or disorderly fashion.

Figure 3:
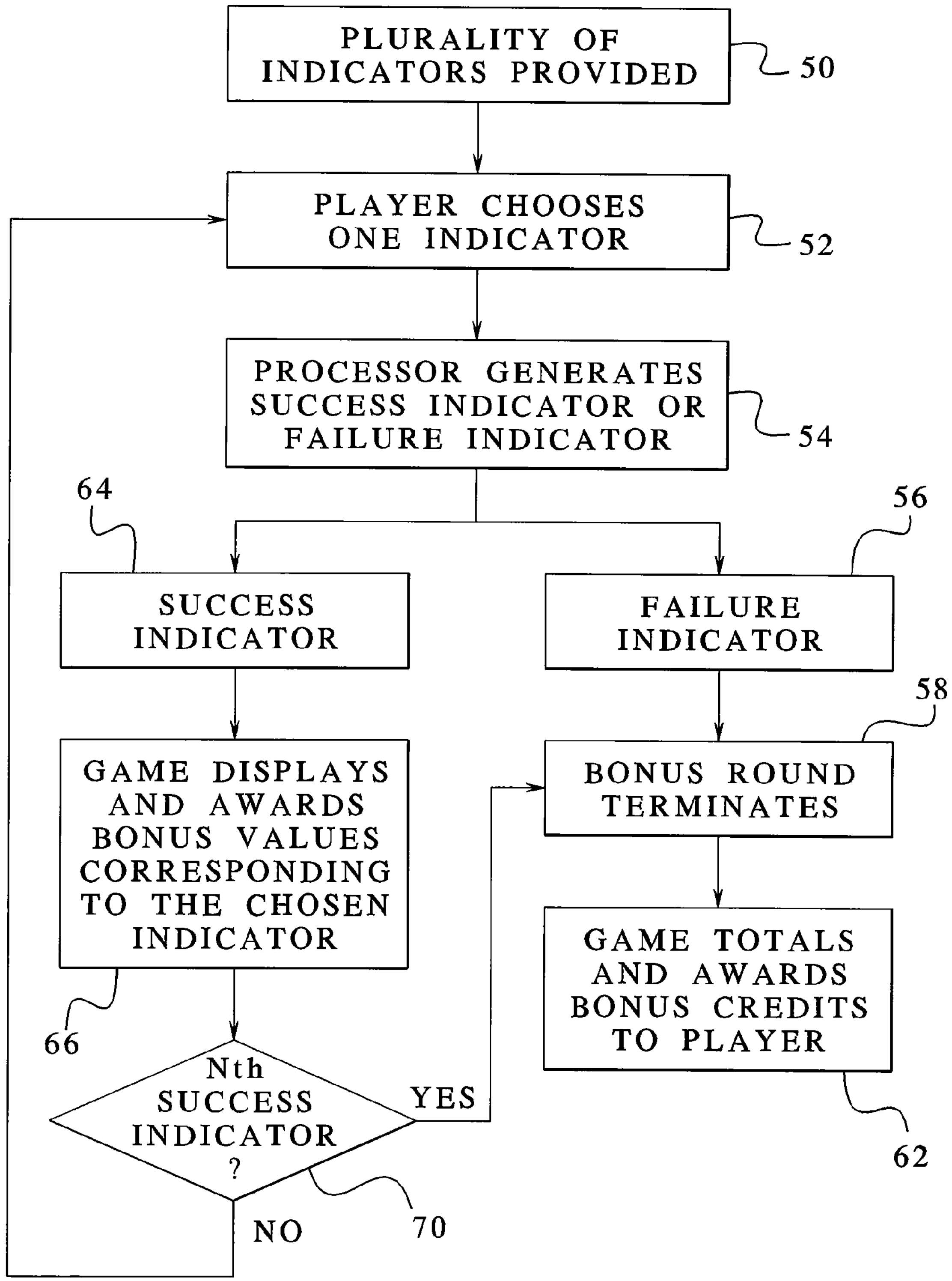
FIG. 3 is a flow diagram of one embodiment of the primary game of the present invention.
Figure 4:
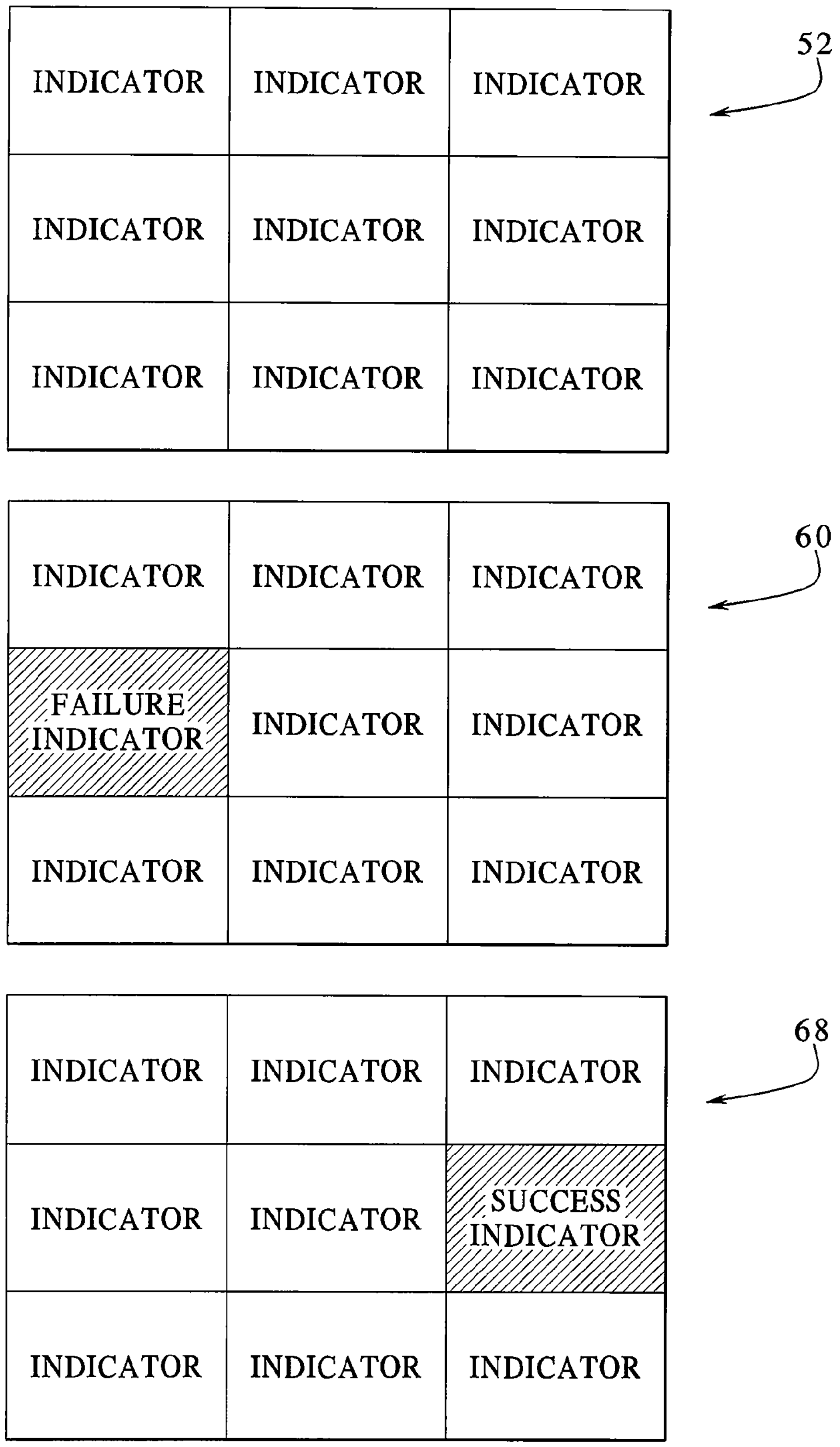
FIG. 4 is a top plan view of the indicators in one embodiment of the primary game of the present invention.

After reviewing the plurality of indicators, the player chooses one indicator by touching the indicators 30 or the screen 32 displaying the indicators, as indicated by block 52 in FIG. 3. Each time a player chooses an indicator, the processor 36 will generate either a success indicator or a failure indicator. When the player chooses an indicator, or preferably prior to displaying all the indicators to the player, the processor carries out one or more mathematical calculations based on predetermined independent probabilities for each indicator and determines if the indicator will be a success indicator or a failure indicator as indicated by block 54. In one embodiment, for all of the indicators for a particular game, the processor 36 uses the same probability of being a success indicator. Other embodiments of the present invention can use different probabilities which may or may not vary for each indicator.

As shown in FIG. 3, if processor 36 generates or displays a failure indicator as indicated by block 56, the bonus round (if the game is a bonus game or round) terminates as indicated by block 58. A failure indicator is generally illustrated in grid 60 in FIG. 4 (i.e., the player selected the indicator in the first column and second row which resulted in a failure indicator.)

Upon termination, the game accumulates any values and awards them to the player as indicated by block 62. If processor 36 generates or displays a success indicator, the game awards the player with values corresponding to the chosen indicator, as indicated by blocks 64 and 66. A success indicator is illustrated in grid 68 in FIG. 4 (i.e., the player selected the indicator in the third column and second row which resulted in a success indicator.) The success indicator may be a value of number of credits or symbol which represents a number of credits.

The processor 36 also determines how many success indicators the player has achieved, as indicated by diamond 70. In this embodiment, the maximum amount of success indicators any player can achieve is equal to the total number of indicators in any particular game. For instance, if the game has ten indicators, a player could achieve no more than ten success indicators.

If the amount of success indicators a player achieves is less than the total amount of indicators provided in the game, the player may select another indicator. This process continues until the processor 36 generates or displays a failure indicator or until the player has achieved the maximum amount of success indicators. In either case, preferably the game terminates as indicated by block 58, and the gaming device 10 awards credits to the player as indicated by block 62. It should be appreciated that the game of the present invention could be designed so that if a player achieves the maximum amount of success indicators, the game awards the player with an achievement value and/or the game is automatically renewed. The achievement value can be any amount and determined in any manner. Preferably, the achievement value is a predetermined value.

Furthermore, if processor 36 generates success indicators and failure indicators before the player chooses an indicators, the game can include a reveal screen. The game of the present invention can be designed so that when a choice results in a failure indicator, video monitor 32 shown in FIG. 1 graphically reveals the location of the success indicators and failure indicators. This reveal screen can increase the excitement experienced by a player because the player will know which indicators would have been successful.

Since the game of the present invention utilizes a probability-based mathematical calculation, a player may reach a failure indicator early in the game (i.e., within the player's first few choices). At some point after playing several games, players can become frustrated if, within their first few choices, they repeatedly reach a failure indicator. It should be appreciated that certain techniques can be used to minimize this type of frustration.

One technique requires processor 36 to perform its probability-based calculation before the player chooses an indicator. Processor 36 can discard its mathematical results and generate new results whenever a relatively high or predetermined percentage of failure indicators have been generated. This technique and others may be used to increase the likelihood that a player will achieve at least a minimal level of success and increase player excitement and enjoyment.

The game of the present invention provides players with an alternative type of element of chance not offered in known games. The game provides players with an opportunity to choose from a group of indicators. The outcome could be a success indicator or a failure indicator. The outcome is not fixed, limiting a player's chance of success. Instead, the outcome varies, depending upon a mathematical probability calculation. A player could thus choose all of the indicators, all resulting in success indicators. At the same time, upon a player's first choice, the outcome could be a failure indicator, ending the game. An additional value could be awarded if the player obtains all success indicators in the game. Alternatively, in such case, the game may be repeated.

Figure 5:
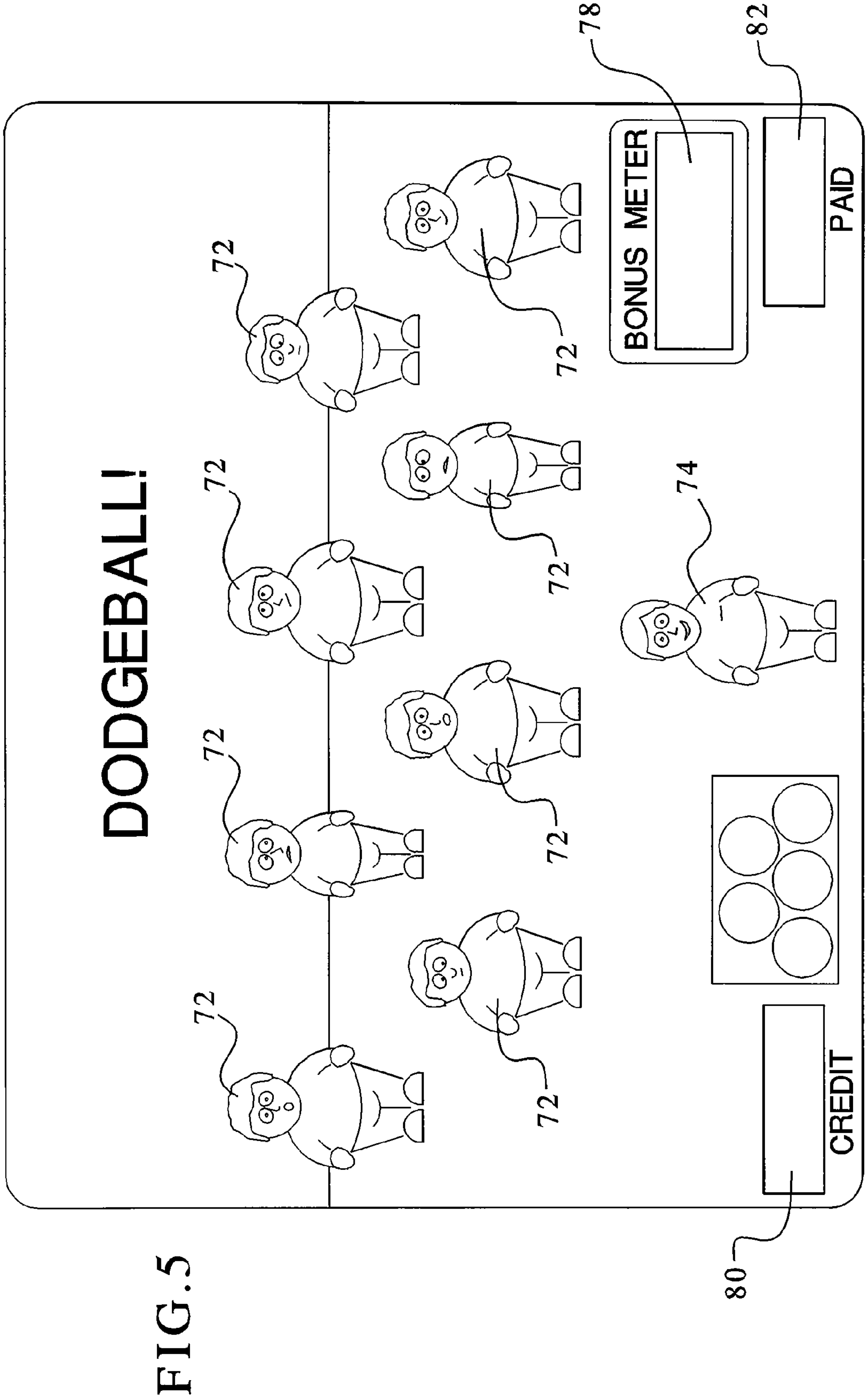
FIG. 5 is a top plan view of an alternative embodiment of the indicators of the primary game of the present invention.

In one example embodiment of the present invention shown in FIG. 5, the game is a primary game which is implemented through target characters 72 participating in a dodgeball game. The target characters 72 are the indicators. Another character 74 throws a ball at a target character 72 selected by the player. The player chooses a target character 72 by touching touch screen 44 at the location of the image of the target character 72. After the player touches touch screen 44, the character 74 automatically retrieves a ball and throws it at the selected target character 72.

Prior to displaying the target characters 72 or when a player chooses a target character 72, the processor 36 performs mathematical calculations based on the predetermined probability for each indicator. The processor 36 generates or displays a success indicator or failure indicator for the chosen target character 72. If the processor 36 generates or displays a success indicator, the ball hits the target character 72 and bounces off the target character 72. The target character 72 is knocked over or off balance, and a credit appears near the target character 72. In addition meter 78, which displays a running total of all values will display the values which the player gained.

If the processor 36 generates or displays a failure indicator, the target character 72 catches the ball and the primary game terminates. In addition, if the player achieves a number of success indicators equal to the total number of target characters, the primary game automatically terminates. In either case, once the primary game terminates, the game accumulates and awards any credits which the player gained. The game displays the credit points which the player gained at credit meter 80. The game displays the amount of money the player has won in the paid window 82 illustrated in FIG. 5.

As shown in FIG. 5, the scenery for this embodiment is a gymnasium setting including one or more phrases such as "Let's Play Dodgeball!" In addition, this embodiment can include audio features (i.e., songs, voices, and other sound effects) which are consistent with the dodgeball theme of this preferred embodiment.

As discussed above, it should be appreciated that the primary game can provide the player with no award, an award less than the player's wager, an award equal to the player's wager or an award greater than the player's wager. For instance, in one embodiment, if the player wagers $0.25 and the player's first indicator is independently determined to be a failure indicator, the primary game ends and the player obtains no award. In another example, the player may make a wager of $0.25 and the player picks the first three selectable indicators which are success indicators. For each success indicator, the processor of the gaming device provides the player with a return of $0.05. On the fourth selected indicator, the player obtains a failure indicator. In this example, the player obtains an award less than the player's wager. In this example, if the player had picked five success indicators in a row, then the player would have obtained an award equal to the player's wager. In this example, if the player would have picked more than five selectable indicators which are success indicators, each subsequent success indicator would provide an award (and the player's total award would continue to increase above the player's wager). It should be appreciated that one of ordinary skill in the art can set or adjust the wager amounts and the award amounts in any suitable desired manner to provide any suitable desired paytable. It should also be appreciated that the independent probability success percentage or award percentage may be suitably adjusted to provide the appropriate paytable. It should also be appreciated that the primary game may alternatively not end when a player picks an indicator that is a failure indicator. Instead, the game may enable the player to select one or more or all of the rest of the selectable indicators.

In an alternative embodiment of the present invention, the gaming device may require the player to obtain a certain number of success indicators or a threshold number of success indicators before providing the player with any award. For example, the player may be required to obtain five out of ten success indicators to obtain an award. Additionally, in such alternative embodiment, each additional success indicator above the threshold could provide a larger award to the player. For instance, the sixth success indicator could provide double the player's award, the seventh success indicator could provide triple the award, the eighth success indicator could provide four times the award, the ninth success indicator could provide five times the award and the tenth success indicator could provide a larger award or jackpot to the player. It should be appreciated that the number of selectable indicator and the associated independent success probabilities for each indicator could be arranged in any suitable manner desired by the game implementor as discussed above. It should also be appreciated that the number of selectable indicators could vary, and that the number of selectable indicators, independent success probabilities associated with the selectable indicators and the awards associated with the success indicators or threshold(s) could vary based on the amount of the player's wager. It should also be appreciated that certain thresholds of success indicators or success indicators obtained in a row (in the embodiment where a failure indicator does not end the game) could be employed to trigger additional awards, trigger bonus games, trigger jackpots and re-trigger the primary game.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device which stores a plurality of instructions, which when executed by said at least one processor, cause said at least one processor to operate with said at least one input device and said at least one display device to, for a play of a game:

(a) display a plurality of selectable indicators, each of said selectable indicators having a predetermined independent probability of being a success indicator associated with said selectable indicator, wherein the independent probabilities associated with the selectable indicators are independent of each other, wherein at least two of the selectable indicators are associated with different independent probabilities, (b) enable a player to pick of one of said displayed selectable indicators, (c) determine whether said picked selectable indicator is the success indicator or a failure indicator, said determination being based on an independent random generation in accordance with the independent probability associated with said picked selectable indicator, (d) if the picked selectable indicator is the failure indicator, automatically terminate the play of the game for the player, and (e) if the picked selectable indicator is the success indicator:

(i) display any award associated with said picked selectable indicator, and (ii) repeat (b) to (e) until any picked selectable indicator is the failure indicator or until all of the displayed selectable indicators have been picked.

2. The gaming device of claim 1, wherein said plurality of instructions, when executed by said at least one processor, cause said at least one processor to operate with the at least one display device and the at least one input device to enable a player to pick at least one of the displayed selectable indicators.

3. The gaming device of claim 1, wherein for each picked selectable indicator, said independent random generation is prior to the picking of said selectable indicator.

4. The gaming device of claim 1, wherein the game is a primary game operable upon a wager placed by a player.

5. The gaming device of claim 1, wherein a plurality of selectable indicators have different awards associated with said selectable indicators.

6. The gaming device of claim 1, wherein the at least one processor includes a processor which is remote from the gaming device.

7. A gaming device comprising:

at least one display device;

at least one input device;

at least one processor; and at least one memory device which stores a plurality of instructions, which when executed by said at least one processor, causes said at least one processor to operate with said at least one input device and said at least one display device to, for a play of a game:

(a) display a plurality of selectable indicators, each of said selectable indicators having a predetermined independent probability of being a success indicator associated with said selectable indicator, wherein the independent probabilities associated with the selectable indicators are independent of each other, wherein at least two of the selectable indicators are associated with different independent probabilities, (b) enable a player to pick of one of said displayed selectable indicators, (c) determine whether said picked selectable indicator is the success indicator or a failure indicator, said determination being based on an independent random generation in accordance with the independent probability associated with said picked selectable indicator, (d) if the picked selectable indicator is the failure indicator, automatically terminate the play of the game for the player, (e) if the picked selectable indicator is the success indicator:

(i) determine if all of the displayed selectable indicators have been picked, (ii) if all of the displayed selectable indicators have been picked, automatically terminate the play of the game for the player, and (iii) if there is at least one displayed selectable indicator which has not been picked, repeat (b) to (e) until any picked selectable indicator is the failure indicator or until all of the displayed selectable indicators have been picked, and (f) upon termination of the play of the game, display at least one award associated with any picked selectable indicators which are success indicators.

8. The gaming device of claim 7, wherein said plurality of instructions, when executed by said at least one processor, cause said at least one processor to operate with the at least one display device and the at least one input device to enable a player to pick at least one of the displayed selectable indicators.

9. The gaming device of claim 7, wherein for each picked selectable indicator, said independent random generation is prior to the picking of said selectable indicator.

10. The gaming device of claim 7, wherein the game is a primary game operable upon a wager placed by a player.

11. The gaming device of claim 7, wherein a plurality of selectable indicators have different awards associated with said selectable indicators.

12. The gaming device of claim 7, wherein the at least one processor includes a processor which is remote from the gaming device.

13. A gaming device comprising:

at least one display device;

at least one input device;

at least one processor; and at least one memory device which stores a plurality of instructions, which when executed by said at least one processor, cause the at least one processor to operate with said at least one input device and said at least one display device to, for a play of a game:

(a) display a plurality of selectable indicators, each of said selectable indicators having a predetermined independent probability of being a success indicator associated with said selectable indicator, wherein the independent probabilities associated with the selectable indicators are independent of each other, wherein at least two of the selectable indicators are associated with different independent probabilities, (b) enable a player to pick of one of said displayed unpicked selectable indicators, (c) determine whether said picked selectable indicator is the success indicator or a failure indicator, said determination being based on an independent random generation in accordance with the independent probability associated with said picked selectable indicator, (d) if said picked selectable indicator is the failure indicator, automatically terminate said play of the game for the player, and (e) if said picked selectable indicator is not the failure indicator:

(i) display any award associated with said picked selectable indicator, and (ii) repeat (b) to (e) at least once.

* * * * *

UNITED STATES PATENT AND TRADEMARK OFFICE

CERTIFICATE OF CORRECTION

PATENT NO. : 7,963,841 B2
APPLICATION NO. : 11/534451
DATED : June 21, 2011
INVENTOR(S) : Anthony J. Baerlocher et al.

It is certified that error appears in the above-identified patent and that said Letters Patent is hereby corrected as shown below:

In Claim 2, column 9, line 5, replace “a player” with --the player--.

In Claim 4, column 9, line 11, replace “a player” with --the player--.

In Claim 5, column 9, line 13, before “selectable indicators,” add --the--.

In Claim 8, column 10, line 10, replace “a player” with --the player--.

In Claim 10, column 10, line 16, replace “a player” with --the player --.

In Claim 11, column 10, line 18, before “selectable indicators,” add --the--.

Signed and Sealed this
Twenty-sixth Day of June, 2012

David J. Kappos
*Director of the United States Patent and Trademark Office*